(12) United States Patent
Kusmanoff et al.

(10) Patent No.: US 8,583,720 B2
(45) Date of Patent: Nov. 12, 2013

(54) RECONFIGURABLE NETWORKED PROCESSING ELEMENTS PARTIAL DIFFERENTIAL EQUATIONS SYSTEM

(75) Inventors: Antone Kusmanoff, Greenville, TX (US); Matthew P. DeLaquil, Rockwall, TX (US); Deepak Prasanna, Ellicott City, MD (US); Jerry W. Yancey, Rockwall, TX (US)

(73) Assignee: L3 Communications Integrated Systems, L.P., Greenville, TX (US)

( * ) Notice: Subject to any disclaimer, the term of this patent is extended or adjusted under 35 U.S.C. 154(b) by 814 days.

(21) Appl. No.: 12/703,513

(22) Filed: Feb. 10, 2010

(65) Prior Publication Data

US 2011/0196907 A1   Aug. 11, 2011

(51) Int. Cl.
G06F 7/38    (2006.01)
G06F 17/22   (2006.01)

(52) U.S. Cl.
USPC .............................. 708/446; 715/267; 700/33

(58) Field of Classification Search
None
See application file for complete search history.

(56) References Cited

U.S. PATENT DOCUMENTS

| | | | | |
|---|---|---|---|---|
| 6,421,622 | B1 * | 7/2002 | Horton et al. | 702/95 |
| 7,454,320 | B1 * | 11/2008 | James | 703/2 |
| 8,266,621 | B2 * | 9/2012 | Murata et al. | 718/102 |
| 2004/0133616 | A1 * | 7/2004 | Manevitz et al. | 708/443 |

OTHER PUBLICATIONS

Strzodka, R, Pinpelined Mixed Precision Algorithms on FPGAs for Fast and Accurate PDE Solvers from Low Precision Components, Apr. 2006, pp. 1-11.*

* cited by examiner

*Primary Examiner* — Henry Tsai
*Assistant Examiner* — Dean Phan
(74) *Attorney, Agent, or Firm* — Hovey Williams LLP

(57) ABSTRACT

A method for using a system to compute a solution to a partial differential equation (PDE) broadly comprises the steps of determining the true accuracy required (TAR) to solve the PDE, determining an architecture according to the TAR that performs a plurality of calculations to solve the PDE, determining a time allowed (TA) and a time required (TR) based on the architecture to solve the PDE, rejecting the PDE if the TR is less than or equal to the TA, configuring a plurality of programmable devices with the architecture, initiating the calculations, and ceasing the calculations when an accuracy criteria is met or when the TA expires. The system broadly comprises a plurality of programmable devices, a plurality of storage elements, a device bus, a plurality of printed circuit (PC) boards, and a board to board bus.

10 Claims, 3 Drawing Sheets

RECONFIGURABLE NETWORKED PROCESSING ELEMENTS PARTIAL DIFFERENTIAL EQUATIONS SYSTEM

BACKGROUND OF THE INVENTION

1. Field of the Invention

Embodiments of the present invention relate to high-performance computing. More particularly, embodiments of the present invention relate to systems and methods of computing a solution to a partial differential equation.

2. Description of the Related Art

Many fundamental physical phenomena, such as the behavior of forces, the motion of objects, the thermal energy of a body, the behavior of electric and magnetic fields, the flow of fluids, and the like, are described by partial differential equations (PDEs). The solutions to PDEs are used to solve problems in engineering and scientific endeavors in variety of fields including fluid dynamics, electromagnetic systems, quantum mechanics, meteorology, economics, biochemical systems, and many others. However, in many situations, the computational requirements to solve the PDEs may be prohibitively large and finding the solution may be time consuming. For example, some PDEs may include millions of unknowns and may require thousands of iterations to resolve each unknown. The solution to such a PDE may require days or even weeks utilizing a cluster of computing systems. The large amount of computation time may be unacceptable if the computing systems are needed for other tasks or if the solution is needed sooner. Furthermore, general purpose computers, such as desktop computers and workstations, are equipped to perform a wide variety of tasks that require very little, if any, computational power. Thus, general purpose computers aren't typically equipped with the processing ability to solve PDEs.

SUMMARY OF THE INVENTION

Embodiments of the present invention solve the above-mentioned problems and provide a distinct advance in the art of high-performance computing. More particularly, embodiments of the invention provide a system with a plurality of reconfigurable networked processing elements and methods that compute a solution to a partial differential equation.

Various embodiments of the present invention provide a system for computing a solution to a partial differential equation (PDE) which broadly comprises a plurality of programmable devices, a plurality of storage elements, a device bus, a plurality of printed circuit (PC) boards, and a board to board bus. The programmable devices may include a plurality of configurable devices that perform a plurality of calculations either in series or in parallel or a combination thereof. The storage elements may include a plurality of memory components which store data that is used during the computation of the PDE solution. The device bus may include one or more communication channels that transport data from one programmable device to one or more other programmable devices. The PC boards generally support and retain the programmable devices and the device bus. The board to board bus may include may include one or more communication channels that transport data from one PC board to one or more other PC boards.

The programmable devices may be configured with an architecture that may include a plurality of processing elements that are coupled together such that one processing element may be able to communicate through a network with any other processing element or all other processing elements. The processing elements may be configured to perform the calculations needed to solve the PDE.

Various embodiments of the present invention may also provide a method for computing a solution to a partial differential equation (PDE) which broadly comprises the steps of determining the true accuracy required (TAR) to solve the PDE, determining an architecture according to the TAR that performs a plurality of calculations to solve the PDE, determining a time allowed (TA) and a time required (TR) based on the architecture to solve the PDE, rejecting the PDE if the TR is less than or equal to the TA, configuring a plurality of programmable devices with the architecture, providing an initial PDE solution to the programmable devices, initiating the calculations, reconfiguring the programmable devices to possess a different architecture during the calculations, and ceasing the calculations when an accuracy criteria is met or when the TA expires.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
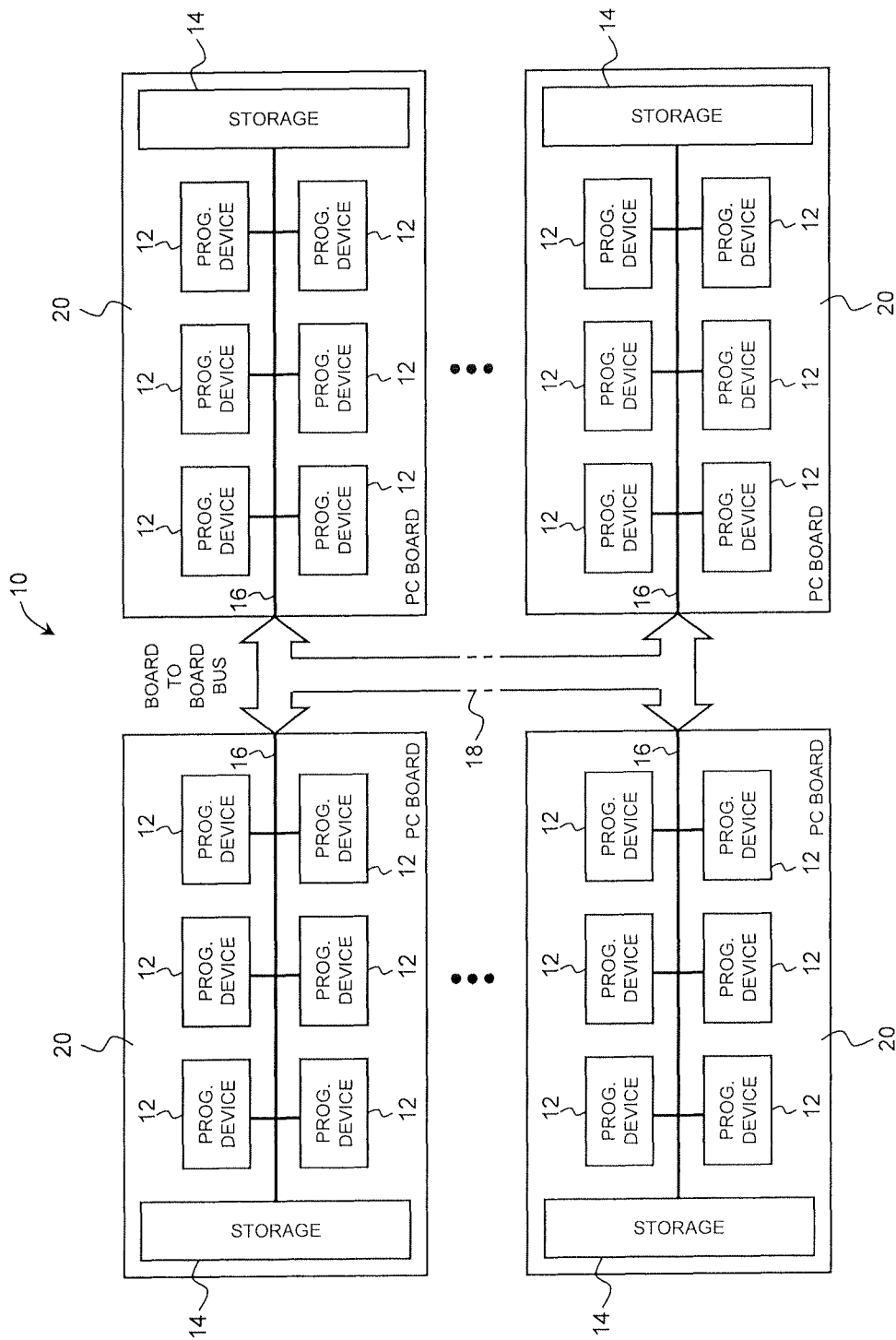
FIG. 1 is a block diagram of a system for computing a solution to a partial differential equation (PDE) constructed in accordance with various embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

A system 10 for solving partial differential equations (PDEs) constructed in accordance with various embodiments of the present invention is shown in FIG. 1. The system 10 may broadly comprise a plurality of programmable devices 12, a plurality of storage elements 14, a device bus 16, a board to board bus 18, and a plurality of printed circuit (PC) boards 20.

Each programmable device 12 generally performs a plurality of calculations either in series or in parallel or a combination thereof and either individually or in combination with other programmable devices 12 to compute a solution to the PDE. The programmable device 12 may also possess the capability to be reprogrammed or reconfigured during the computation of the PDE solution. The programmable device 12 may include any circuit, combination of circuits, architecture, or the like, that is capable of assuming a variety of configurations, wherein each configuration may perform a specific function. The programmable devices 12 may be implemented on one or more PC boards 20.

The programmable devices 12 may include configurable devices such as programmable logic devices (PLDs), programmable logic arrays (PLAs), and complex programmable logic devices (CPLDs). However, typically, the programmable devices 12 include field-programmable gate arrays (FPGAs). Each FPGA may include a plurality of configurable logic blocks with configurable communication interconnects and switches therebetween, internal memory storage, input/output (I/O) blocks, and specialized functional blocks, among other components. An exemplary FPGA is the Virtex-II Pro XC2VP50 FPGA manufactured by Xilinx of San Jose, Calif., which may include over 20,000 configurable logic blocks, over 800 I/O pads, specialized multiplier blocks, embedded processor blocks, and internal random-access memory (RAM).

The programmable device 12 may be programmed or configured using known methods such as schematic capture, wherein an electronic circuit schematic is created with computer-aided design (CAD) software and then converted to code appropriate for the programmable device 12, or hardware description language (HDL) programming, wherein the function to be performed is described with computer code segments that are written in an HDL, such as VHDL or Verilog, and then converted to code appropriate for the programmable device 12. Furthermore, the programmable device 12 may be able to store the program internally, or the program may be stored in a device or unit, such as compact flash memory external to but in the vicinity of the programmable device 12.

The storage elements 14 generally store data that is used during the computation of the PDE solution. The data may be initial data on which the computation is to be performed, intermediate calculation data, final solution data that is buffered before being transmitted out of the system 10, or combinations thereof. The storage elements 14 may include circuits or devices that are capable of receiving, storing, and transmitting data. Each storage element 14 may logically separable and or physically separable sub units. Various embodiments may include random access memory (RAM), such as static RAM (SRAM) or dynamic RAM (DRAM), that may be implemented on one or more PC boards 20. Other embodiments may also include disc storage such as hard disk drives (also known as hard drives) or floppy disc drives, flash memory storage such as compact flash memory cards or flash memory drives, or combinations thereof that may be implemented external to the system 10 and coupled to one of more PC boards 20.

The device bus 16 generally transports data from one programmable device 12 to one or more other programmable devices 12, as well as any programmable device 12 to the storage element 14. Each programmable device 12 may include high-speed transceiver components, either built-in or synthesized from configurable logic blocks, that couple to the device bus 16. In addition, the device bus 16 may couple to the board to board bus 18. Typically, each PC board 20 has one device bus 16. The device bus 16 may be a single-channel serial line, wherein all the data is transmitted in serial fashion, a multi-channel (or multi-bit) parallel link, wherein different bits of the data are transmitted on different channels, or variations thereof, wherein the device bus 16 may include multiple lanes of bi-directional data links. Various embodiments of the device bus 16 may be implemented as one or more conductive traces on one or more layers of the PC board 20.

The board to board bus 18 generally transports data from the device bus 16 on one PC board 20 to the device bus 16 on one or more other PC boards 20. Similar to the device bus 16, the board to board bus 18 may be a single-channel serial line, wherein all the data is transmitted in serial fashion, a multi-channel (or multi-bit) parallel link, wherein different bits of the data are transmitted on different channels, or variations thereof, wherein the device bus 16 may include multiple lanes of bi-directional data links. In various embodiments, the board to board bus 18 may be implemented as a backplane or other communications bus in a rack mounted system or a motherboard system. The PC boards 20 may include edge connectors which plug into the rack or motherboards in order to access the board to board bus 18. In other embodiments, the board to board bus 18 may be implemented as electrically conductive or optically conductive cables that couple to connectors attached to the PC boards 20. The cables may be single conductor or multiconductor, such as ribbon cables, which correspond to the single channel or multichannel architecture of the board to board bus 18.

The PC boards 20 generally support and retain the programmable devices 12, while providing electric power for the programmable devices 12 and the resources for the device bus 16. Each PC board 20 may constructed, as is known in the art, from a rigid, electrically insulating material such as fiberglass or woven glass, although other insulators may be used that possess different dielectric properties. Each PC board 20 may also include multiple layers or planes of electrically conductive material, such as copper, with the insulating material therebetween. The conductive layers may include power and ground planes as well as signal layers. The device bus 16 may include traces of copper implemented on signal layers of the PC boards 20. The programmable devices 12, along with other supporting components, may be attached to the PC boards 20 with an electrically conductive bonding material such as solder.

Figure 2:
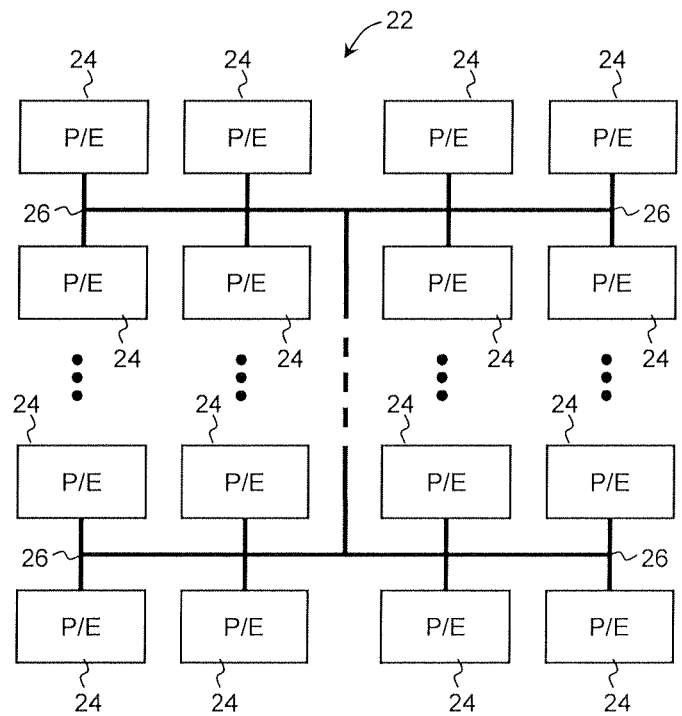
FIG. 2 is a block diagram of an exemplary architecture of the system.

In order to compute a solution to a PDE, the system 10 may be configured with an architecture 22, such as the exemplary architecture 22 shown in FIG. 2. The architecture 22 may include a plurality of computer nodes or processing elements 24 that are coupled together such that one processing element 24 may be able to communicate through a network 26 with any other processing element 24 or all other processing elements 24. Each processing element 24 may be formed from configurable logic blocks and/or larger functional blocks built in to the programmable devices 12. The processing elements 24 may be configured to perform the calculations needed to solve the PDE, such that, for a given PDE, at least a portion of the processing elements 24 may have the same structure or all of the processing elements 24 may be different.

Figure 3:
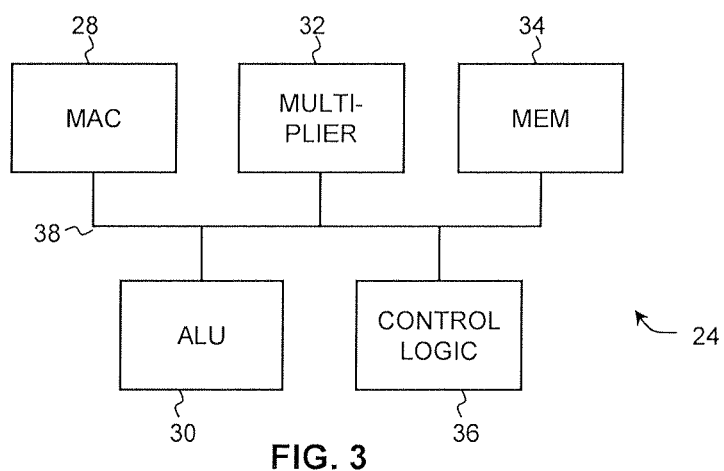
FIG. 3 is a block diagram of an exemplary processing element of the architecture.

An exemplary processing element 24 is shown in FIG. 3. The processing element 24 typically includes at least some of the following: a multiply-accumulator (MAC) 28, an arithmetic logic unit (ALU) 30, a multiplier 32, a local memory element 34, a control logic unit 36, and a communications bus 38.

The MAC 28 generally multiplies two numbers together and adds the product to a third number. The MAC 28 may include a multiplier and an adder that receives the output of the multiplier, both of which may be programmable in the length of the dataword that they can handle. The MAC 28 may also include temporary data storage registers and additional logic to allow the sum from the adder to be fed back as an input to the multiplier.

The ALU 30 generally provides some arithmetic functions and logic functions. The ALU 30 may include arithmetic gates such as adders and subtracters, combinational logic gates such as AND, OR, and NOT gates, and other logic blocks such as shift registers, encoders, decoders, multiplexers, demultiplexers, and the like. The ALU 30 may also include lookup table structures and temporary data storage registers.

The multiplier 32 generally multiplies two numbers together. The multiplier 32 may be formed from specialized multiplier functional blocks that are built in to the programmable devices 12 and are typically higher performance than multipliers that are synthesized from configurable logic blocks. An exemplary multiplier 32 is the 18 bit×18 bit multiplier available in the Virtex-II Pro XC2VP50 FPGA.

The local memory element 34 generally provides temporary storage of data between calculations and buffering of data both before and after calculations. The local memory element 34 may include RAM structures that are built in to the programmable devices 12. The local memory element 34 may have a programmable configuration with single or dual data ports, variable address space, and variable dataword length. Furthermore, the local memory element 34 may The control logic unit 36 generally controls the timing and the flow of data through the processing element 24. The control logic unit 36 may receive a commencement of calculations signal and may generate a conclusion of calculations signal. The control logic unit 36 may include combinational logic, registers, and lookup tables formed from the components of the programmable devices 12.

The communications bus 38 generally provides communication between the components of the processing element 24 and may transmit and receive both data and control signals. The communications bus 38 may couple to all of the components of the processing element 24 and may further connect to the network 26 to establish communication with other processing elements 24. The communications bus 38 may be formed from the switching and interconnect structures built in to the programmable devices 12 and may be configured to include lines for all the necessary data and control signals.

The network 26 generally provides communication between processing elements 24. The network 26 may include the communications bus 38, the device bus 16, and the board to board bus 18. Thus, the network 26 may be formed from switching and interconnect structures in the programmable devices 12, conductive traces on the PC boards 20, and backplane or cabling structures between the PC boards 20. Furthermore, the network 26 allows for the processing elements 24 to communicate, when necessary, with the storage elements 14 to retrieve initial data, temporarily store data between calculations, and buffer data to be transmitted out of the system 10 after the PDE solution is computed.

The system 10 may operate as follows. The PDE may be analyzed and a suitable solution architecture 22 may be established, which may include determining the number of processing elements 24 that are necessary along with the function of each processing element 24 including any algorithms that the processing element 24 may execute. HDL code, including behavioral algorithms, functional block instances, or combinations thereof, may be written to describe the system 10. The code may be compiled and downloaded to the programmable devices 12 to configure each device 12. The configuration code may be stored in memory devices on each PC board 20. In various embodiments, the solution to the PDE may require that one or more of the programmable devices 12 are reconfigured during the computation. Thus, more than one configuration for each programmable device 12 may be stored in memory on each PC board 20.

Once the programmable devices 12 have been configured, the initial data may be loaded into the storage elements 14. The initial data may include measured values of one or more parameters of the external system for which a PDE solution is to be found. After the data is loaded, the computation may begin. The processing elements 24 may perform calculations in parallel fashion, serial fashion, or combinations of both. In various embodiments, the programmable devices 12 may be reconfigured during the computation. When the computation is complete, the solution data may be buffered in the storage elements 14 before being transmitted out of the system 10.

The system 10 may be used to solve a PDE as follows. Before developing a configuration for an architecture for the system 10, the true accuracy required (TAR) may be evaluated. The TAR primarily influences the resolution or the number of bits that a dataword possesses, wherein the datawords are the numbers used in the calculations and at least some datawords represent values of the problem to be solved. For example, if the problem to be solved involves measured voltages, then each dataword might represent a voltage. And the accuracy required may depend, among other things, on the input data, which in this case may be the measurements of the voltage. For example, the voltage values may be supplied by an analog-to-digital converter (ADC). If the ADC produces an 8-bit output, then the TAR may be approximately eight bits which means that the size of the dataword may be approximately eight bits. Using an accuracy that is less than required may lead to an erroneous solution. Using an accuracy that is greater than required may make inefficient use of the programmable devices, which could result in the computation of the PDE solution taking a greater time. Furthermore, the TAR may change for different stages of the computation.

The size of the dataword may have an impact on many components of the system 10 such as the size of arithmetic units like adders and multipliers as well as the size of data registers and storage elements 14. Thus, once the TAR is determined for the entire computation of the PDE solution, the configuration program to implement the architecture for the programmable devices 12 may be written to incorporate the appropriate TAR.

The nature of the problem and the system 10 resources, with the TAR taken into account, may be evaluated in order to determine the time required (TR) to solve the problem and the time allowed (TA) to solve the problem. Computing a solution to a PDE often requires iterative techniques, which involve a loop or sequence of operations and calculations that are performed repeatedly until a certain criterion is met. The number of loops that are required and the number of operations per loop may be determined by the method chosen to solve the PDE. The execution time may also depend on the resources of the programmable devices 12. In general, fewer processing elements 24 as a result of fewer programmable device 12 resources may take longer to compute a PDE solution. Additionally, physical properties of the programmable devices 12 may influence the execution time of a given implementation of a processing element 24. Thus, the TR for a given PDE may be estimated from, among other parameters, the number of loops required for a certain solution, the number of operations per loop, and the execution time for each operation or loop.

The TA for a problem to be solved is typically determined by real world demands on an engineering computing system. Often, there are a number of problems to be solved on a computing system within a given time period, thus resulting in a limited TA for each problem.

When the TR and the TA are known, the viability of the PDE for the system 10 may be determined. If for a given PDE the TR is less than or approximately equal to the TA, then the PDE may not fully utilize the capabilities of the system 10 and the PDE may be solved on a general purpose computing system. On the other hand, if the TR is at least approximately ten times greater than the TA, then the PDE is appropriate to be solved by the system 10.

Once the PDE is determined applicable to be solved by the system 10, then the programmable devices 12 may be configured with the configuration program to implement the architecture, and input data may be received by the system 10 and stored in the storage elements 14. Some solutions to the PDE may utilize iterative techniques that require an initial starting point solution. An initial solution may be provided to the system 10 at this point. Then the system 10 may perform calculations according to the configuration program.

In various embodiments, the computation of the PDE solution may be performed in stages, wherein each stage may include a different sequence of calculations. Between two or more stages, the programmable devices 12 may be reconfigured. The reconfiguration may create different structures within the processing elements 24 that in turn perform different calculations.

In some embodiments, during the computation, one or more processing elements 24 may have more calculations to perform than other processing elements 24 do. In order to balance the computational load between the processing elements 24, the programmable devices 12 may be reconfigured to allow processing elements 24 with a smaller load to assume a greater share of the calculations.

The calculations may continue until an accuracy criteria is met or until the TA expires. Iterative numerical techniques might not find a true solution to the PDE, but the techniques may produce very good, acceptable approximations. Iterations may continue until the approximation meets a criteria. In some embodiments, each iteration may produce a delta or residual value which is added to the solution of the previous iteration. The calculations may continue until the delta value is less than a given small number. This is a likely indication that the answer is not changing much on successive iterations, implying that the approximation may be very close to the solution. Otherwise, the calculations may continue until the TA expires and the most recent approximation is accepted as the solution to the PDE.

Figure 4:
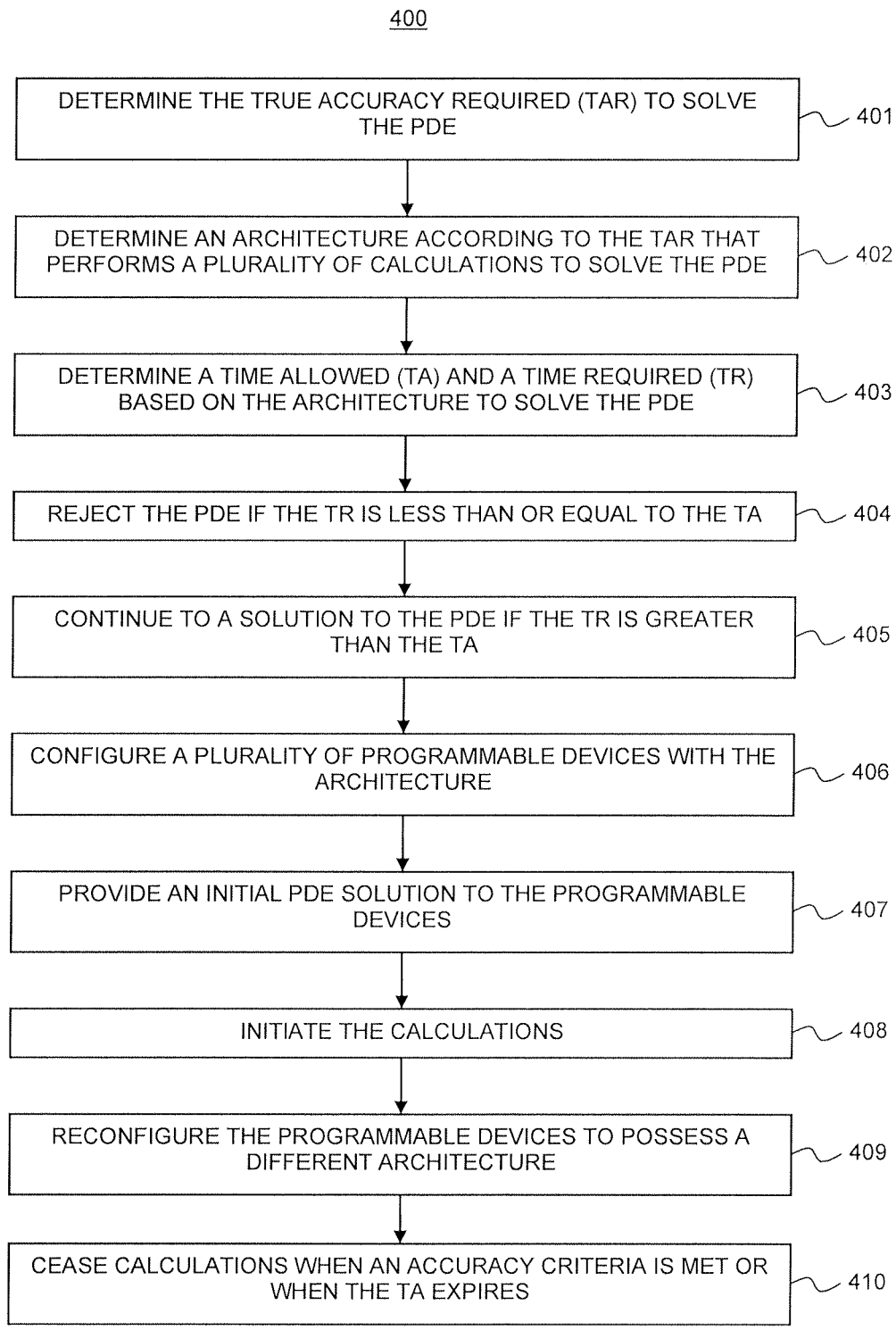
FIG. 4 is a flow diagram of at least a portion of the steps of a method for computing the solution to a PDE.

At least a portion of the steps of a method 400 of using the system 10 to solve a PDE in accordance with various embodiments of the present invention is listed in FIG. 4. The steps may be performed in the order as shown in FIG. 4, or they may be performed in a different order. Furthermore, some steps may be performed concurrently as opposed to sequentially.

In connection with step 401, the true accuracy required (TAR) to solve the PDE is determined. The TAR primarily influences the resolution or the number of bits that a dataword possesses, wherein the datawords are the numbers used in the calculations and at least some datawords represent values of the problem to be solved. The TAR may change for different stages of the computation.

In connection with step 402, an architecture 22 is determined according to the TAR that performs a plurality of calculations to solve the PDE. The architecture 22 may include a plurality of processing elements 24 that are coupled together such that one processing element 24 may be able to communicate through a network 26 with any other processing element 24 or all other processing elements 24.

In connection with step 403, a time allowed (TA) and a time required (TR) are determined based on the architecture 22 to solve the PDE. The TA may depend on usage limitations for the system 10. The TR may depend on the number of calculations to be performed and the time required for each calculation, which may in turn depend on the architecture 22.

In connection with step 404, the PDE is rejected of the TR is less than or equal to the TA. In this situation, it is likely that the computation of a solution to the PDE might underutilize the resource of the system 10, and the PDE may be effectively solved on a general purpose computing system.

In connection with step 405, the method 400 continues if the TR is greater than the TA. The system 10 may be best utilized to compute a solution to the PDE if the TR is much larger than the TA, for example if the TR is at least approximately ten times greater than the TA.

In connection with step 406, a plurality of programmable devices 12 is configured with the architecture 22. A programming code that describes the architecture 22 may be written, compiled, and downloaded to the programmable devices 12 to configure each device 12.

In connection with step 407, an initial solution of the PDE is provided to the programmable devices 12. Some solutions to the PDE may utilize iterative techniques that require an initial starting point solution.

In connection with step 408, the calculations to find the solution to the PDE are initiated. In connection with step 409, the programmable devices 12 are reconfigured to possess a different architecture 22. Some solutions to the PDE may require multiple stages of calculations. The solutions may utilize algorithms that include different equations for different stages. Thus, the programmable devices 12 may be reconfigured between stages with a different architecture 22.

In connection with step 410, the calculations cease when an accuracy criteria is met or when the TA expires. Some algorithms used to find a solution to the PDE may produce approximations to the solution at the end of each iteration of calculations. The calculations may cease when the approximations are not changing very much from iteration to iteration. Alternatively, the calculations may cease when the TA runs out because the system 10 may be required for another computation.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of computing a solution to a partial differential equation (PDE) utilizing a plurality of programmable devices, the method comprising the steps of:
   a) determining the true accuracy required (TAR) to solve the PDE;
   b) determining an architecture according to the TAR that performs a plurality of calculations to solve the PDE;

c) determining a time allowed (TA) and a time required (TR) based on the architecture, wherein TA depends on usage limitations of a system and TR depends on a number of calculations to be performed to solve the PDE;

d) rejecting the computation of the PDE if the TR is less than or equal to the TA; and e) accepting the computation of the PDE if the TR is greater than the TA, configuring the programmable devices with the architecture, initiating the calculations, and ceasing the calculations when an accuracy criteria is met or when the TA expires.

2. The method of claim 1, further including the step of providing an initial PDE solution to the programmable devices.

3. The method of claim 1, further including the step of reconfiguring the programmable devices to possess a different architecture during the calculations.

4. The method of claim 1, wherein the TAR controls the size of a dataword used in the calculations.

5. A method of computing a solution to a partial differential equation (PDE) utilizing a plurality of programmable devices, the method comprising the steps of:

a) determining the true accuracy required (TAR) to solve the PDE;

b) determining an architecture according to the TAR that performs a plurality of calculations to solve the PDE;

c) determining a time allowed (TA) and a time required (TR) based on the architecture, wherein TA depends on usage limitations of a system and TR depends on a number of calculations to be performed to solve the PDE;

d) rejecting the computation of the PDE if the TR is less than or equal to the TA; and e) accepting the computation of the PDE if the TR is greater than the TA, configuring the programmable devices with the architecture, providing an initial PDE solution to the programmable devices, initiating the calculations, reconfiguring the programmable devices to possess a different architecture during the calculations, and ceasing the calculations when an accuracy criteria is met or when the TA expires.

6. The method of claim 5, wherein the TAR controls the size of a dataword used in the calculations.

7. The method of claim 1, wherein the TAR is determined by the resolution of data that is input to the programmable devices.

8. The method of claim 1, wherein the TAR is determined by a number of bits output from an analog to digital converter that supplies data to the programmable devices.

9. The method of claim 5, wherein the TAR is determined by the resolution of data that is input to the programmable devices.

10. The method of claim 5, wherein the TAR is determined by a number of bits output from an analog to digital converter that supplies data to the programmable devices.

* * * * *